United States Patent
Klinghult

(10) Patent No.: US 9,330,243 B2
(45) Date of Patent: May 3, 2016

(54) METHOD FOR BIOMETRICALLY CONTROLLING DEVICE ACCESS AND DEVICE THEREFOR

(75) Inventor: Gunnar Klinghult, Lund (SE)

(73) Assignee: SONY CORPORATION, Tokyo (JP)

( * ) Notice: Subject to any disclaimer, the term of this patent is extended or adjusted under 35 U.S.C. 154(b) by 90 days.

(21) Appl. No.: 13/148,766

(22) PCT Filed: Sep. 10, 2010

(86) PCT No.: PCT/EP2010/063302
§ 371 (c)(1),
(2), (4) Date: Nov. 28, 2011

(87) PCT Pub. No.: WO2012/031634
PCT Pub. Date: Mar. 15, 2012

(65) Prior Publication Data
US 2013/0160109 A1   Jun. 20, 2013

(51) Int. Cl.
*G06F 21/00*   (2013.01)
*G06F 21/31*   (2013.01)
(Continued)

(52) U.S. Cl.
CPC ............... *G06F 21/31* (2013.01); *G01J 5/0025* (2013.01); *G01J 5/025* (2013.01); *G01J 5/0265* (2013.01); *G01J 5/048* (2013.01); *G01J 5/0846* (2013.01); *G01J 5/34* (2013.01); *G06F 1/1684* (2013.01); *G06F 1/1696* (2013.01); *G06F 3/041* (2013.01);
(Continued)

(58) Field of Classification Search
CPC ......... G06F 21/32; G06F 21/00; G06F 21/31; G06F 21/6245; G06F 17/30; G06F 17/30861; G06F 19/00; G06F 19/30; G06F 19/321; G06F 19/323; G06F 19/324; G06F 19/327; G06F 21/577; G06F 21/6227; G06F 21/80; H04L 63/0861; H04L 67/02; H04L 2209/56; H04L 63/0838; H04L 63/18; H04L 12/587; H04L 2209/608; H04L 2209/805; H04L 2209/88; H04L 29/06; H04L 51/24; H04L 63/0442; H04L 63/061; H04L 63/0853
USPC ............................... 382/115; 713/186; 726/19
See application file for complete search history.

(56) References Cited

U.S. PATENT DOCUMENTS

| | | | |
|---|---|---|---|
| 4,516,112 A | * | 5/1985 | Chen .................................. 341/34 |
| 6,289,114 B1 | * | 9/2001 | Mainguet ...................... 382/124 |

(Continued)

FOREIGN PATENT DOCUMENTS

| | | |
|---|---|---|
| EP | 2 103 988 | 9/2009 |
| KR | 1020090065182 | 6/2009 |

OTHER PUBLICATIONS

Armitage et al., Infrared Sensing using pyroelectric polymers, Dec. 1997, Napier University, 7 Total Pages.*

(Continued)

*Primary Examiner* — Jeffery Williams
*Assistant Examiner* — Christopher C Harris
(74) *Attorney, Agent, or Firm* — Tucker Ellis LLP

(57) ABSTRACT

A method and device for user authorization is presented herein. The authorization device may be integrated in a display interface configured to receive an infrared input signal. The device may include a means for converting the infrared signal into an electric signal. The device may further include a processor configured to analyze the electrical signal. The processor may further be configured to provide an authorization of a user based on the analysis of the electrical signal.

20 Claims, 5 Drawing Sheets

(51) Int. Cl.
*G01J 5/00* (2006.01)
*G01J 5/02* (2006.01)
*G01J 5/04* (2006.01)
*G01J 5/08* (2006.01)
*G01J 5/34* (2006.01)
*G06F 1/16* (2006.01)
*G06F 3/041* (2006.01)
*G06F 21/32* (2013.01)
*G06K 9/00* (2006.01)
*G07C 9/00* (2006.01)
*H04M 1/67* (2006.01)

(52) U.S. Cl.
CPC .............. *G06F 21/32* (2013.01); *G06K 9/0002* (2013.01); *G07C 9/00158* (2013.01); *H04M 1/67* (2013.01)

(56) References Cited

U.S. PATENT DOCUMENTS

| | | | |
|---|---|---|---|
| 6,353,472 B1 * | 3/2002 | Bault | 356/71 |
| 8,424,079 B2 * | 4/2013 | Adams et al. | 726/17 |
| 2005/0134751 A1 * | 6/2005 | Abileah et al. | 349/42 |
| 2006/0022958 A1 | 2/2006 | Shiga | |
| 2008/0069412 A1 * | 3/2008 | Champagne et al. | 382/124 |
| 2008/0114678 A1 * | 5/2008 | Bennett et al. | 705/44 |
| 2008/0122792 A1 | 5/2008 | Izadi et al. | |
| 2008/0175444 A1 * | 7/2008 | Maro et al. | 382/115 |
| 2008/0175450 A1 * | 7/2008 | Scott | 382/124 |
| 2008/0273013 A1 | 11/2008 | Levine et al. | |
| 2008/0283751 A1 * | 11/2008 | Kymissis | 250/338.3 |
| 2008/0285813 A1 * | 11/2008 | Holm | 382/115 |
| 2009/0083850 A1 * | 3/2009 | Fadell et al. | 726/19 |
| 2010/0289772 A1 * | 11/2010 | Miller | 345/175 |
| 2011/0119759 A1 * | 5/2011 | McKeeth | 726/19 |
| 2011/0287741 A1 * | 11/2011 | Prabhu | 455/411 |

OTHER PUBLICATIONS

International Search Report and Written Opinion dated Feb. 9, 2011 issued in corresponding PCT application No. PCT/EP2010/063302, 9 pages.

* cited by examiner

METHOD FOR BIOMETRICALLY CONTROLLING DEVICE ACCESS AND DEVICE THEREFOR

TECHNICAL FIELD

Example embodiments presented herein are directed towards a method and device for authorization, which is integrated in a display interface. The device may comprise pyroelectric, or pyroelectric and piezoelectric, material configured to analyze a surface interaction with the display interface.

BACKGROUND

Many forms of identification or authorization are used to protect various types of data. One such form of authorization may be obtained through the use of biometrics. Biometrics may be used to identify an individual based upon one or more physical traits. One of the most common forms of biometrics is fingerprint analysis.

Fingerprint sensors are often used to provide user authorization in the protection of electronic data. Fingerprint sensors employ a number of sensing techniques such as Radio Frequency (RF) technology, capacitive detection, and microthemistor sensing.

FIGS. 1A and 1B provide illustrative examples of a mobile device 100 comprising a fingerprint sensor 105. The fingerprint sensor 105 may be included as a separate attachable component 106. Alternatively, the fingerprint sensor 105 may be included on a backside 103 of the mobile device 100. A user may place their finger on a panel of the sensor 105, where a surface contact provided by a fingerprint 107 may be analyzed for authorization. Upon determining the authorization of the user, access to information on the mobile device may or may not be provided.

SUMMARY

The object is to provide an improved method and device for authorization. The object is achieved by integrating authorization techniques with preexisting components of a multimedia device (e.g., a display interface for the presentation of information for visual and/or tactile reception), thereby reducing the need of extra hardware (as illustrated in FIGS. 1A and 1B).

This object is achieved by a method of receiving an infrared input signal via a display interface, converting the infrared input signal to an electrical signal, analyzing the electrical signal, and authorizing a user based on the analyzing.

The infrared signal may be, for example, black body radiation (e.g., electromagnetic or heat radiation) radiated from a user. The expression "authorizing a user based on the analyzing" as used herein is intended to mean that the result of analyzing is compared to one or more infrared input signals in order to ascertain whether a received infrared input signal corresponds to recognized/stored data. The term "display interface" used herein is an interface for the presentation of information for visual and/or tactile reception.

In some example embodiments the method may include using pyroelectric, or piezoelectric and pyroelectric, based material for the step of converting the infrared input signal into the electric signal.

In some example embodiments the pyroelectric, or piezoelectric and pyroelectric, material may be integrated in the display interface.

In some example embodiments the pyroelectric, or piezoelectric and pyroelectric, material may be in the form of a piezoelectric plastic. The piezoelectric plastic may be Polyvinylidene Flouride (PVDF).

In some example embodiments the pyroelectric, or piezoelectric and pyroelectric, material may be transparent or semi-transparent.

In some example embodiments the step of analyzing may further comprise complying an image mapping of thermal differences induced by a surface interaction made by the user with regards to the display interface. The term "surface interaction" need not necessarily mean that a user needs to make direct physical contact with the display interface. Rather the term means that the user interacts with the display interface in such a way as to enable analysis of a biometric parameter (e.g., a finger and/or ear-print) to be made.

In some example embodiments the image mapping may be representative of a biometric parameter of the user.

In some example embodiments the steps of analyzing and providing may be performed during a restricted access function. The term "restricted access function" used herein may be interpreted as various functions performed by the device. For example, accessing emails, accessing a contact list, sending messages, starting the device, or accessing any form of private or personal data.

In some example embodiments the steps of analyzing and providing may be performed during menu navigation.

In some example embodiments the step of receiving may further comprise receiving a touch sensing signal which may be indicative of a location of the surface interaction, and the step of analyzing may further comprise determining the location of the surface interaction.

Example embodiments may also comprise a computer program product wherein it comprises a computer program comprising program code means arranged to cause a computer or a processor to execute the analyzing and providing steps of a method according to any of the example embodiments discussed above, stored on a computer-readable medium or carrier wave.

Example embodiments may also comprise a device for authorization. The device comprising a display interface configured to receive an infrared input signal, a means for converting the infrared signal into an electrical signal, an internal or external processor configured to analyze the electrical signal produced as a result of the infrared input signal, and the processor further configured to provide an authorization of a user based on the analysis of the electric signal. It should be appreciated that the processor may be arranged inside the device. Alternatively, the device may be arranged to communicate with an external processor through a wireless or wired connection.

In some example embodiments the means for converting may be integrated in the display interface.

In some example embodiments the means for converting may be a pyroelectric, or piezoelectric and pyroelectric, material In some example embodiments the pyroelectric, or piezoelectric and pyroelectric, material may comprise a piezoelectric plastic. The piezoelectric plastic may be Polyvinylidene Flouride (PVDF).

In some example embodiments the pyroelectric, or piezoelectric and pyroelectric, material may be transparent or semi-transparent.

In some example embodiments the processor may be further configured to compile an image mapping of thermal differences induced by a surface interaction made by the user on the display interface.

In some example embodiments the image mapping may be representative of a biometric parameter of a user.

In some example embodiments the authorization may be provided during a restricted access function.

In some example embodiments the authorization may provided during menu navigation.

In some example embodiments the means for converting may further comprise a means for receiving a touch sensing signal indicative of a location of the surface interaction, and the processor may further be configured to determine the location of the surface interaction.

In some example embodiments the display interface may a component of a multimedia device.

In some example embodiments the device is a mobile telephone, media player, PDA, computer, security display panel, or camera.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in manners that depart from these specific details. In other instances, detailed descriptions of well-known methods and elements are omitted so as not to obscure the description of the example embodiments.

Figure 1A:
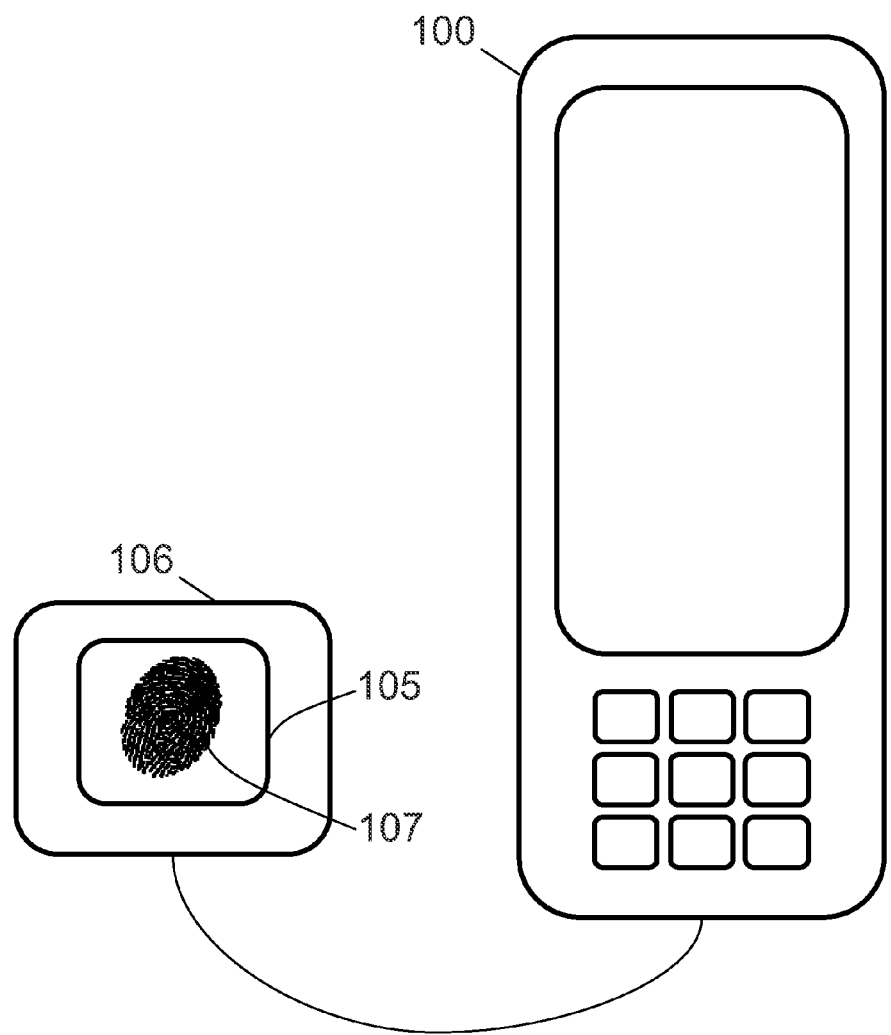
FIGS. 1A and 1B are illustrative examples of device authorization according to the prior art.
Figure 1B:
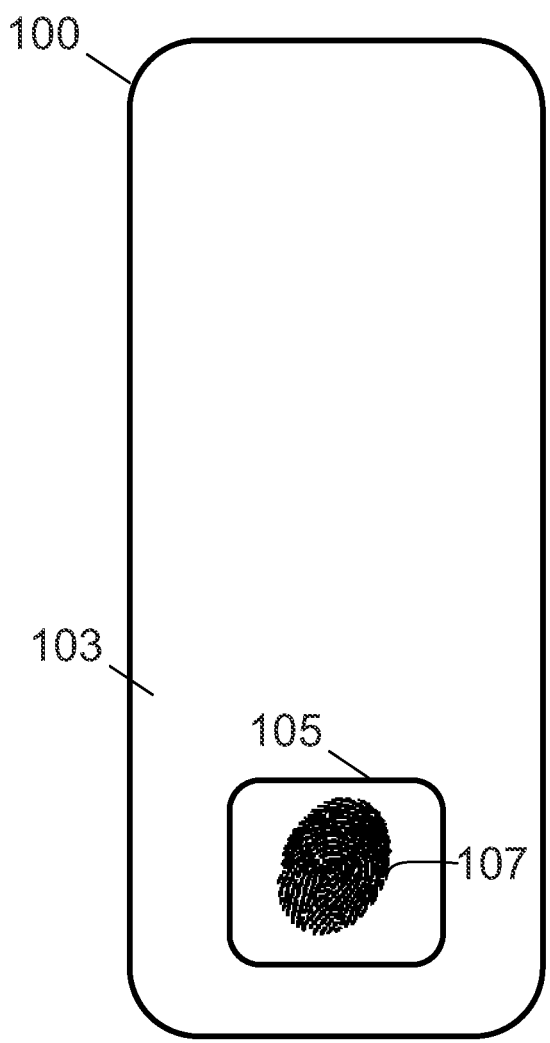
Figure 2:
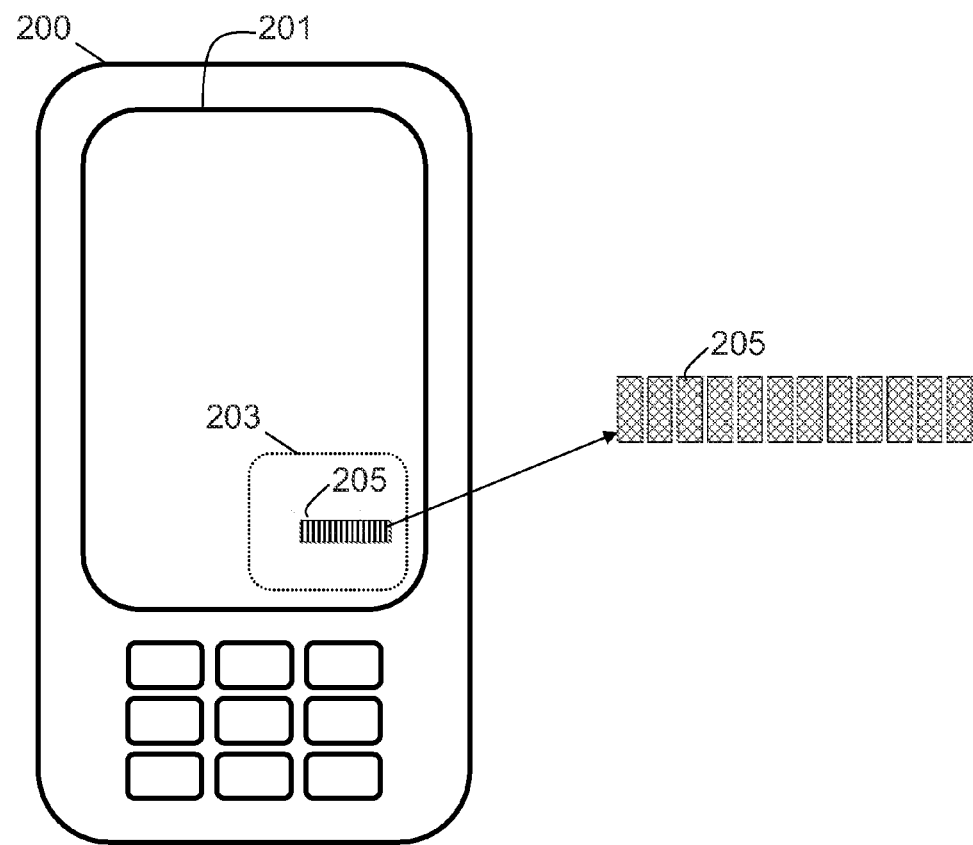
FIG. 2 is a schematic of a multimedia device with integrated authorization according to example embodiments.

FIG. 2 illustrates a multimedia device 200 featuring an integrated means for authorization 203. In the example provided by FIG. 2, the multimedia device 200 is a mobile phone. It should be appreciated that example embodiments may be applied to any device having a visual display known in the art, for example, PDAs, computers, cameras, or security systems featuring a control panel display.

The device 200 may comprise a display interface 201 that be configured to provide a user with information. It should be appreciated that the display interface may be any interface known in the art for the presentation of information for visual and/or tactile reception.

The display interface 201 may also comprise an authorization sensing area 203. The authorization sensing area 203 may comprise any number of sensors 205. The sensors 205 may be pyroelectric, or piezoelectric and pyroelectric, material based sensors. For example the sensors may be in the form of a piezoelectric plastic, such as Polyvinylidene Flouride (PVDF). PVDF may be in the form of a thin transparent, or semi-transparent, plastic film with piezoelectric and pyroelectric properties. PVDF may also be configured to strongly absorb infrared energy in the wavelength range of 7 μm to 20 μm which is also the wavelength spectrum of heat emitted from a human body. Thus, PVDF may be used to detect direct or indirect human contact. PVDF also has the property of producing electric signal in response to changes in temperature. Thus, the infrared signals detected by a PVDF sensor array 205 may be converted to electrical signals which may be used in the authorization analysis. In some example embodiments the changes in temperature and electric signal may be used to compile a mapping representative of, for example, a fingerprint in contact with the display interface. It should be appreciated that other biometric parameters besides a fingerprint may be used. For example, an ear-print may be analyzed.

It should further be appreciated that PVDF is merely an example of a piezoelectric plastic and any other type of pyroelectric, or piezoelectric and pyroelectric, based material or piezoelectric plastic may be used.

Figure 3:
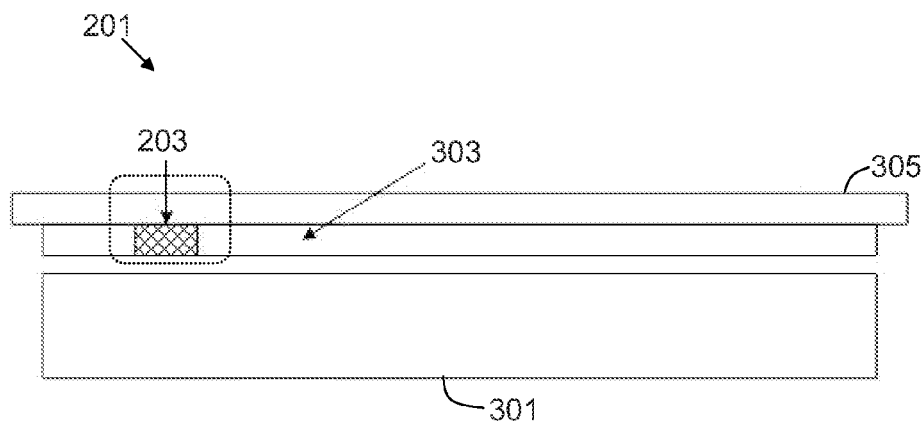
FIG. 3 is a cross-sectional view of a display interface of the device of FIG. 2 according to example embodiments.

FIG. 3 provides a cross-sectional view of the display interface 201. As illustrated, the integrated sensing area 203 may be situated between a display screen 301 and a front surface 305, which may be, for example, a glass or plastic panel. The sensing area 203 may be integrated within a touch sensing layer 303. The touch sensing layer 303 may employ, for example, capacitive sensing technology to detect when a user is providing input via the display interface 201. It should be appreciated that any other sensing means known in the art may be employed, for example, resistive technology, surface acoustic wave technology, surface capacitance technology, projected capacitance technology, mutual capacitive sensors, self capacitance sensors, strain gauge or force panel technology, optical imaging, dispersive signal technology, acoustic pulse recognition, and coded LCD technology. It should further be appreciated that the sensor array 205 may include sensors with authorization capabilities and sensors with touch sensing capabilities.

The PVDF sensor array 205 may be coated with a transparent, or semi-transparent, material such as Indium tin oxide (ITO), Carbon Nano Tubes (CNT), Grafen, or any other type of transparent, or semi-transparent, material known in the art. Thus, the PVDF sensing array 205 may be implemented immediately above, below, or anywhere else within the touch sensing array layer without affecting the operation of the touch sensors or obscuring the visual output of the display 301.

It should further be appreciated that the PVDF sensor array 205 may be integrated within, above, or below the front substrate 305, or the display screen 301.

It should further be appreciated that the sensing area 203 may be implemented in a localized area (e.g., a corner of the display interface 201). A localized sensing area may be beneficial for providing authorizations for restricted access functions. Examples of a restricted access function may be accessing emails, a contact list, sending messages, starting a device, or accessing any form of private or personal data. Thus, prior to performing a restricted access function, a user may be prompted, for example, to place his or her finger, or ear, on the integrated sensing area 203 for authorization analysis.

Alternatively, the sensing area 203 may be equal to the size of the display interface 201. A larger sensing area may be beneficial for continuous, or periodic, authorization analysis. For example, authorization analysis may be performed during an entire use of the device. During a continuous mode of operation, authorization analysis may be performed as a user navigates through a displayed menu. Thus, the sensing area 203 may be integrated with the touch sensing mechanisms of the device. Therefore, the sensor array 205 may include sensors with touch sensing as well as authorization capabilities. In example embodiments, the sensor array may include pyroelectric, or piezoelectric and pyroelectric, material based sensors (for authorization purposes), as well as capacitive touch sensors (for touch sensing purposes). It should be appreciated that any form of touch sensing technology may be incorporated.

During operation, if an authorized user places his or her device down without locking the device, an unauthorized user may be immediately detected if the unauthorized user attempts to access information on the device (e.g., touching the screen in an attempt to navigate through the displayed menu). The device may be configured to power off or become locked once the presence of an authorized user is detected. It should be appreciated that a periodic mode of operation may be employed wherein the authorization is configured to take place within programmable time intervals.

Figure 4:
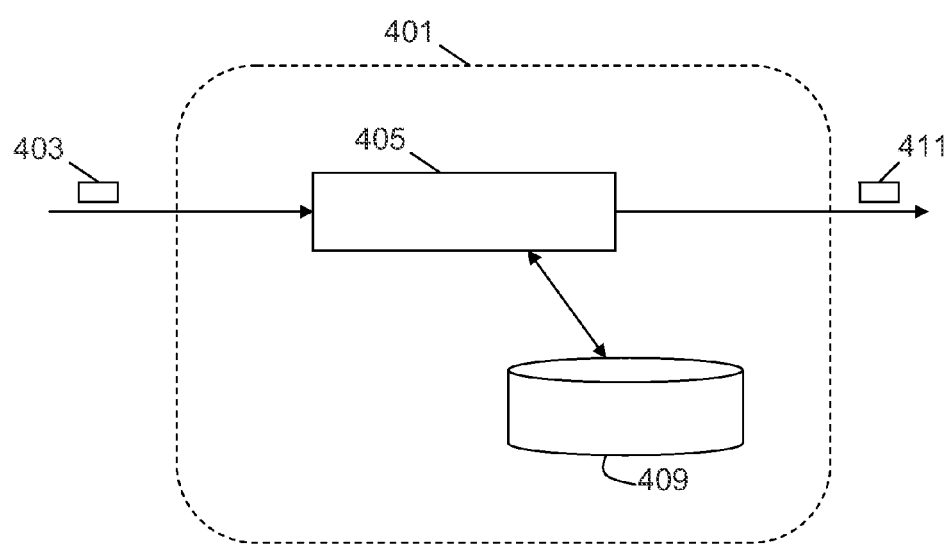
FIG. 4 is a schematic of an authorization unit of the device of FIG. 2 according to example embodiments.
Figure 5:
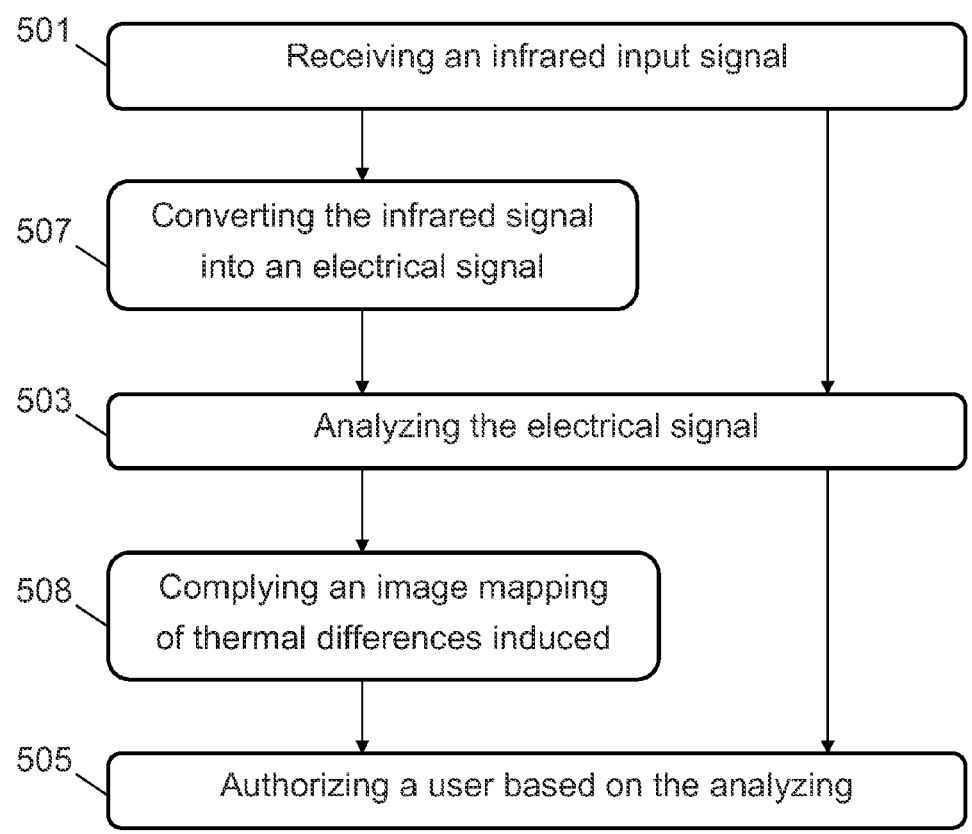
FIG. 5 is a flow diagram of exemplary operational actions that may be taken by the device of FIG. 2 according to example embodiments.

FIG. 4 illustrates some of the hardware components which may be utilized in providing user authorization according to example embodiments. FIG. 5 is a flow diagram depicting exemplary operational actions which may be taken by the components illustrated in FIG. 4.

During operation, the authorization sensor array 205 located in the integrated sensing area 203 may detect an infrared input signal caused by a user surface interaction on the display interface 201 (501). It should be appreciated that the user surface interaction may be a direct or indirect surface contact. For example, a user may place his or her finger directly on the front substrate 305 and within the sensing area 203. The sensor array 205 may also be able to detect the infrared signal once the user's finger is in close proximity to the sensing area 203. Furthermore, a user may place the sensing area 203 in close proximity to his or her ear, wherein the sensor array 205 will be able to detect an infrared signal even if direct contact is prevented by the user's hair, for example.

The step of receiving the infrared input signal may further comprise converting the infrared signal to an electrical signal 403, as such is a property of the PVDF sensor array 205 (507).

Thereafter, the converted electrical signal 403 may be sent to a processor 405. The processor 405 may be configured to analyze the electrical signal 403 (503). The analysis may comprise the compilation of an image mapping of the thermal differences induced by the surface interaction (508). For example, if the surface interaction was created by a user's finger, for example, the image mapping may be representative of the user's fingerprint pattern. The processor 405 may thereafter search through a database 409 in order to compare the current fingerprint with any stored and authorized fingerprint images. Upon receiving the results of the database search, the processor may be configured to send an authorization result 411 to be displayed on the display interface 201.

It should be appreciated that the processor and/or database may be located internally or externally of the device. Furthermore, during the authentication process the device may be configured to communicate with any external components with use of a wired or wireless connection.

It should be appreciated that the integrated authorization device may be programmable. For example, an authorized user may be able to add other authorized users for the device. The authorized user may also be able to modify or restrict the authorization of other users. For example, a master user may have the authorization to free use the device and monitor the authorization of other users. Meanwhile a restricted authorized user may only have limited use of the device.

The above mentioned and described embodiments are only given as examples and should not be limiting. Other solutions, uses, objectives, and functions within the scope of the invention as claimed in the below described patent claims should be apparent for the person skilled in the art. Thus, further modifications of the invention within the scope of the claims would be apparent to a skilled person.

A "device" as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, etc.

The various embodiments described herein is described in the general context of method steps or processes, which may be implemented in one embodiment by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method of authorization comprising:
receiving an infrared input signal via a sensor array located in an integrated sensing area of a display interface of a device,
wherein the sensor array comprises a pyroelectric, or a pyroelectric and piezoelectric, based material integrated in the display interface of the device;
the infrared input signal being caused by a user surface interaction when the user places a finger or ear on, or in close proximity to, the integrated sensing area of the display interface of the device,
converting, by the sensor array, the infrared input signal to an electrical signal;
analyzing the electrical signal; and
biometrically authorizing the user based on the analyzing,
unlocking the device based on the biometric authorization,
continuously analyzing and biometrically authorizing the user based on the user's surface interaction on the integrated sensing area of the display interface of the device while the device is unlocked,
detecting the removal of the user surface interaction on the integrated sensing area of the display interface of the device, and locking the device based on the removal of the users surface interaction on the integrated sensing area of the display interface of the device;

wherein the step of analyzing comprises compiling an image mapping of thermal differences induced by the user surface interaction made by the user with respect to the display interface.

2. The method of claim 1, wherein the pyroelectric and piezoelectric based material comprises piezoelectric plastic.

3. The method of claim 2 wherein the piezoelectric plastic is Polyvinylidene Fluoride (PVDF).

4. The method of claim 1, wherein the pyroelectric, or the pyroelectric and piezoelectric, based material is transparent or semi-transparent.

5. The method of claim 1 wherein the image mapping is representative of a biometric parameter of the user.

6. The method of claim 1, wherein the device is unlocked based on the biometric authorization during a restricted access function.

7. The method of claim 1, wherein the device is unlocked based on the biometric authorization during menu navigation.

8. The method of claim 1, wherein the step of receiving further comprises receiving a touch sensing signal indicative of a location of the surface interaction, and the step of analyzing further comprises determining the location of the surface interaction.

9. A device for authorization comprising:
a display interface configured to receive an infrared input signal caused by a user surface interaction when the user places a finger or ear on, or in close proximity to, a sensing area of the display interface;
means for converting the infrared signal into an electrical signal, wherein the means for converting comprises a pyroelectric, or a pyroelectric and piezoelectric, based material and is integrated in the sensing area of the display interface;
an internal or external processor configured to:
analyze the electrical signal produced as a result of the infrared input signal, wherein when analyzing, the processor is configured to compile an image mapping of thermal differences induced by the user surface interaction made by the user on the display interface;
biometrically authorize the user based on the analysis of the electric signal;
unlock the device based on the biometric authorization,
continuously analyze and biometrically authorize the user based on the user's surface interaction on the integrated sensing area of the display interface of the device while the device is unlocked,
detect the removal of the user surface interaction on the integrated sensing area of the display interface of the device, and
lock the device based on the removal of the users surface interaction on the integrated sensing area of the display interface of the device.

10. The device of claim 9, wherein the pyroelectric and piezoelectric, based material comprises piezoelectric plastic.

11. The device of claim 10 wherein the piezoelectric plastic is Polyvinylidene Fluoride (PVDF).

12. The device of claim 9, wherein the pyroelectric, or the pyroelectric and piezoelectric, based material is transparent or semi-transparent.

13. The device of claim 9, wherein the image mapping is representative of a biometric parameter of a user.

14. The device of claim 9, wherein the authorization is provided during a restricted access function.

15. The device of claim 9, wherein the authorization is provided during menu navigation.

16. The device of claim 9, wherein the means for converting further comprises a means for receiving a touch sensing signal indicative of a location of the surface interaction, and the processor is further configured to determine the location of the surface interaction.

17. The device of claim 9, wherein the display interface is a component of a multimedia device.

18. The device of claim 9, wherein the device is a mobile telephone, media player, PDA, computer, security display panel, or camera.

19. A non-transitory computer readable medium storing a computer program comprising instructions, which when executed by a computer or processor cause the computer or the processor to:
receive an infrared input signal via a sensor array located in an integrated sensing area of a display interface of a device, wherein the sensor array comprises a pyroelectric, or a pyroelectric and piezoelectric, based material integrated in the display interface of the device, and wherein the infrared input signal is caused by a user surface interaction when the user places a finger or ear on, or in close proximity to, the integrated sensing area of the display interface of the device;
convert the infrared input signal to an electrical signal;
analyze the electrical signal; and
biometrically authorize the user based on the analyzing,
unlock the device based on the biometric authorization,
continuously analyze and biometrically authorize the user based on the user's surface interaction on the integrated sensing area of the display interface of the device while the device is unlocked,
detect the removal of the user surface interaction on the integrated sensing area of the display interface of the device, and
lock the device based on the removal of the users surface interaction on the integrated sensing area of the display interface of the device;
wherein the step of analyzing further comprises compiling an image mapping of thermal differences induced by the user surface interaction made by the user with respect to the display interface.

20. The device of claim 9, wherein when analyzing, the processor is configured to perform the analyzing in a continuous or periodic manner.

* * * * *